T. SPENCER.
VENT FOR STORAGE BATTERIES.
APPLICATION FILED NOV. 26, 1915.
1,325,866.
Patented Dec. 23, 1919.
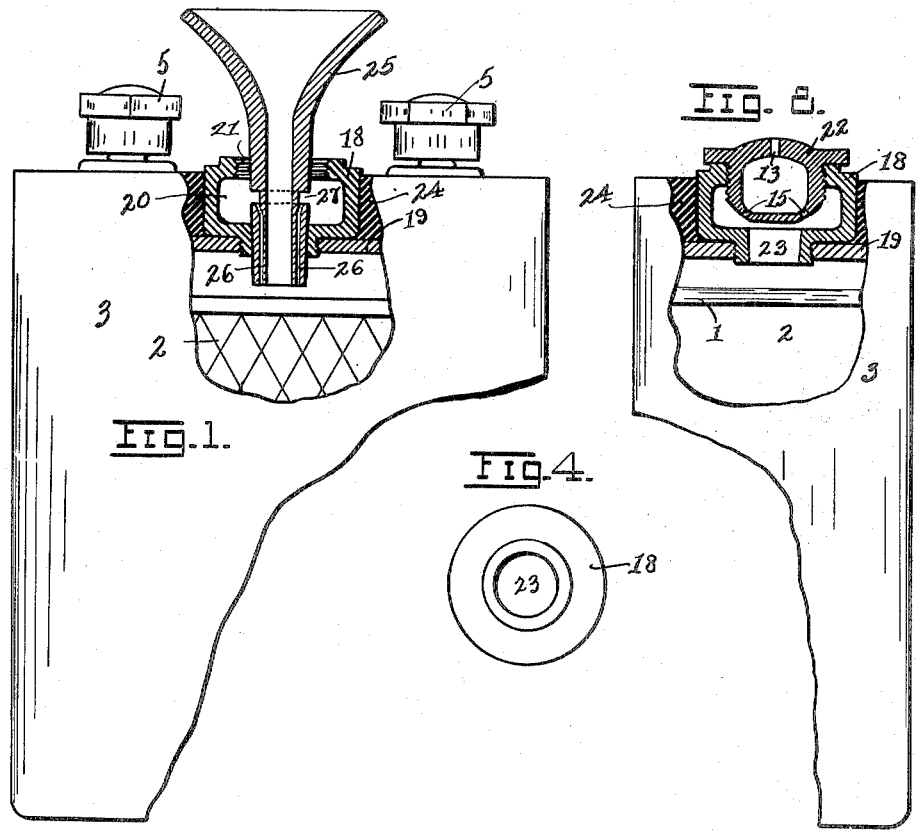
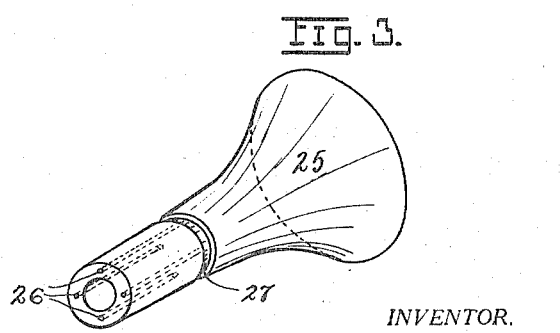
WITNESS
H. G. Grover
INVENTOR.
THOMAS SPENCER
BY Ira J. Adams.
ATTORNEY

UNITED STATES PATENT OFFICE.

THOMAS SPENCER, OF PHILADELPHIA, PENNSYLVANIA, ASSIGNOR, BY MESNE ASSIGNMENTS, TO NATIONAL CARBON COMPANY, INC., OF CLEVELAND, OHIO, A CORPORATION OF NEW YORK.

VENT FOR STORAGE BATTERIES.

1,325,866.      Specification of Letters Patent.      Patented Dec. 23, 1919.

Application filed November 26, 1915. Serial No. 63,658.

*To all whom it may concern:*

Be it known that I, THOMAS SPENCER, a citizen of the United States, residing at Philadelphia, in the county of Philadelphia and State of Pennsylvania, have invented a certain new and useful Improvement in Vents for Storage Batteries, of which the following is a full, clear, and exact description.

This invention relates to vents for storage batteries with special means for preventing the overfilling of the jar.

Since gas is generated in storage batteries during the electrical action of the cell, means must be provided for the passage of such gas to the exterior, otherwise the jar or its cover would be ultimately broken by the pressure of the gas.

Inasmuch as portable storage batteries are extensively used by those having little or no knowledge of their proper care and usage, it is also desirable to have some means to prevent the overfilling of the jar when water is added to the electrolyte from time to time to compensate for evaporation losses.

I accomplish both of the above mentioned purposes by arrangements described in detail in the following specification and illustrated in the annexed drawings, in which:—

Figure 1 is a partial sectional view of a modified form of my invention.

Fig. 2 is another view of the modification shown in Fig. 1.

Fig. 3 is a perspective view of the filling funnel shown in Fig. 1.

Fig. 4 is a plan view of the vent tube shown in Figs. 1 and 2.

In Fig. 1 I have shown a conventional form of storage battery in combination with a vent opening adapted to receive my improvement. In this figure a vent tube 18 is secured in the cover 19 in any appropriate manner and preferably has an annular chamber 20, as shown. The upper end 21 of the tube is threaded to receive a cap 22 and the lower opening 23 is made slightly conical to receive the shank of a filling funnel described later. An asphaltum or pitch seal 24 may be poured on top of the cover as shown.

When the storage battery is in use the cap 22 closes the tube 18 and seals the same with the exception of vent openings in the cap which permit the escape of gas.

When water is to be added to the jar a special funnel 25, shown in perspective in Fig. 3, is inserted in the vent tube after removing the cap 22. This funnel has one or more holes 26 through its lower portion or shank, which communicate with the exterior about midway up the funnel. Preferably these holes terminate in an annular groove 27, as shown in Figs. 1 and 3.

When the funnel has been inserted as illustrated in Fig. 1, water can be readily poured into the jar, since the air will escape through holes 26 and out between the funnel and the upper end of the tube member 18, as the funnel shank makes a tight fit only with the lower opening 23. When the liquid level reaches the lower end of the funnel shank, as shown in Fig. 1, no more water can be added to the cell, as the air is effectively trapped. Further addition of water will merely fill the funnel and give a warning that the cell has been filled to the proper height. The funnel should then be removed and the cap 22 screwed back into position.

The small holes in the funnel shank can be omitted if the large central hole is large enough, say about one inch in diameter, although the smaller funnel with air vents is preferable.

Having described my invention, what I claim is:—

1. In electric batteries, a battery jar, a cover therefor, a vent tube in said cover and a removable funnel having a hollow shank adapted to seat inside the tube when the jar is to be filled said shank having one or more openings extending from the lower end to the exterior surface above said seat whereby air can pass to the exterior of the jar until the liquid level reaches the lower end of the funnel shank.

2. In electric batteries, a battery jar, a cover therefor, a vent tube in said cover having an enlarged chamber, a threaded upper opening, a conical lower opening, and a funnel having a shank adapted to extend through and seat inside said conical opening, said funnel having one or more channels extending from the lower end of the shank to the exterior surface inside said enlarged chamber.

3. In electric batteries, a battery jar, a cover therefor, a vent tube in said cover having an enlarged chamber, a screw threaded upper opening and a lower opening, a funnel having a conical shank adapted to extend through and seat tightly in said lower opening, said funnel having a groove around its exterior portion located in said chamber, and one or more channels extending from the lower end of the shank to said groove.

4. A cover provided with a filling opening, and a tube removably mounted in said opening so as to make an air-tight joint with said cover, said tube extending a definite distance into the cell to which said cover is applied and being provided with an air venting passage independent of its main passage.

5. A storage battery cover provided with a filling opening, a bushing therein and a tube removably mounted in the opening in said bushing so as to make an air-tight joint therewith, said tube extending a definite distance into the cell to which said cover is applied and being provided with an air venting passage independent of said main passage.

In testimony whereof I hereunto affix my signature.

THOMAS SPENCER.